United States Patent [19]
Meyer et al.

[11] Patent Number: 6,068,664
[45] Date of Patent: May 30, 2000

[54] TIGHTENING DEVICE FOR USE WITH SAFETY BELTS WITH ECCENTRIC LOCKING

[75] Inventors: Bernhard Meyer, München; Josef Mayer, Haimhausen, both of Germany

[73] Assignee: Autoliv Development AB, Sweden

[21] Appl. No.: 09/091,118

[22] PCT Filed: Dec. 7, 1996

[86] PCT No.: PCT/EP96/05482

§ 371 Date: Sep. 4, 1998

§ 102(e) Date: Sep. 4, 1998

[87] PCT Pub. No.: WO97/21567

PCT Pub. Date: Jun. 19, 1997

[30] Foreign Application Priority Data

Dec. 12, 1995 [DE] Germany ............ 195 46 280

[51] Int. Cl.[7] .................. B60R 22/36
[52] U.S. Cl. ............ 797/480; 297/478; 280/806
[58] Field of Search ................ 297/472, 478, 297/480; 280/806

[56] References Cited

U.S. PATENT DOCUMENTS

| | | |
|---|---|---|
| 3,287,062 | 11/1966 | Board et al. . |
| 4,840,325 | 6/1989 | Higuchi et al. ............ 280/806 |
| 4,999,004 | 3/1991 | Skanberg et al. .......... 297/480 |
| 5,340,152 | 8/1994 | Fohl ..................... 297/472 X |
| 5,415,431 | 5/1995 | Omura ..................... 297/480 |
| 5,533,756 | 7/1996 | Dybro et al. ............ 280/806 X |

FOREIGN PATENT DOCUMENTS

| | | |
|---|---|---|
| 0186880 | 7/1986 | European Pat. Off. . |
| 0662408 | 7/1995 | European Pat. Off. . |
| 2154049 | 9/1972 | France . |
| 2252031 | 1/1992 | United Kingdom . |
| 9011913 | 10/1990 | WIPO . |
| 9604154 | 2/1996 | WIPO . |

Primary Examiner—Anthony D. Barfield
Attorney, Agent, or Firm—Robert W. Becker & Assoicates

[57] ABSTRACT

A tightening device for a safety belt includes a cable having a first end and a second end. A drive is connected to the first end of the cable. The drive, when activated, moves the cable in a tightening direction. The second end of the cable is connected to a safety belt. A deflection device about which the cable is guided is provided. The deflection device has a rotatable eccentric pawl and a stop. The stop limits rotation of the eccentric pawl when rotated upon movement of the cable in the tightening direction and thus defines a deflection position of the eccentric pawl. The eccentric pawl has an elongate extension extending in a direction of the cable portion extending between the drive and a deflection location at the deflection device. The eccentric pawl has a deflection end guiding the cable at the deflection location. The eccentric pawl has an eccentric arc opposite the deflection end. A counter plate is positioned opposite the eccentric pawl and the cable is guided between the counter plate and the eccentric pawl. The eccentric arc is a return lock preventing movement of the cable in a return direction opposite the tightening direction by engaging the cable and locking the cable in the return direction.

8 Claims, 3 Drawing Sheets

TIGHTENING DEVICE FOR USE WITH SAFETY BELTS WITH ECCENTRIC LOCKING

BACKGROUND OF THE INVENTION

The invention relates to a tightening device for safety belts comprising a cable movable by a drive in a tightening direction and guided about a deflection device, whereby one end of the cable is connected to the drive and the free end is connected to a component of the safety belt. In the area of the deflection device a return lock is provided that is active upon movement of the cable counter to the tightening direction.

Such a tightening device relating to buckle tighteners with the aforementioned features is described in European patent 0 186 880. The cable supporting at one end the belt buckle is guided about a deflection block secured at the vehicle and having a deflection channel for the cable. The other end is connected to the piston of a pyrotechnical drive device since after completion of the tightening movement, loading of the belt buckle in a direction counter to the tightening direction will occur, the pyrotechnical drive device, respectively, its piston is provided with a return lock. This return lock, in a special embodiment of the tightening device known from European patent 01 86 880, has already been moved away from the drive device into the area of deflection, i.e., into the deflection block. For this purpose in the deflection block a chamber is provided for receiving two clamping jaws that surround the cable and upon movement within the chamber will clamp the cable.

The known tightening device has the disadvantage that since the return lock is arranged in the area of the drive device, the parts of the drive device, especially the piston secured at the cable, must be designed for respective loading forces, and inasmuch as the return lock is arranged in the area of the deflection device, the deflection block requires a complicated design including anchoring of the deflection block at the vehicle in order to be able to withstand respective forces.

It is therefore an object of the invention to simplify for a tightening device the deflection device of the cable and the return lock and to simultaneously provide a safely operating return lock for the cable that is easy to install.

SUMMARY OF THE INVENTION

The invention is based on the principle that the deflection device is embodied as a rotatably supported eccentric pawl whose rotation direction resulting from movement of the cable in the tightening direction is stopped by a stop. The eccentric pawl, in the direction of the cable extending between the drive and the deflection device, has an elongate shape. At one end it has a deflection end about which the cable is guided for deflection into the tightening direction, and at its end opposite the deflection end it is provided with an eccentric arc which engages the cable upon movement of the cable counter to the tightening direction end serves as a return lock, whereby the cable is guided between the eccentric pawl and a counter plate.

From U.S. Pat. No. 3,287,062 a clamping device comprising an eccentric pawl is known in a safety belt system for the belt member, whereby the belt member is guided between the eccentric pawl having an outer toothing and a counter plate such that pulling at the belt member in the belt removal direction results in a pivoting of the eccentric pawl into its clamping position. In this known embodiment, the eccentric pull is of an angular design whereby the deflection portion and the tooth clamping portion at the eccentric pawl are directly adjacent to one another.

The invention has the advantage that the movement of the cable is facilitated across the deflection end of the eccentric pawl because enclosure of the cable is realized only directly before the drive device within the straight portion by the counter plate arranged at the eccentric pawl. The locking of the cable required for a return lock action is realized in a simple manner within the deflection device whereby the eccentric pawl itself acts as a locking element for securing the cable at the correlated counter plate. Due to the arrangement of the locking means, acting as a return lock, into the deflection device the mechanical loading of the drive device is reduced so that its individual parts can be dimensioned less sturdily and less complicated.

At the same time, according to one embodiment of the invention, the bearing members of the eccentric pawl can also serve as a fastening element for the tightening device at the vehicle structure, whereby in an advantageous manner a direct force introduction without requiring other components is provided. Such an arrangement is inexpensive and reduces the risk of malfunction.

According to one embodiment of the invention, it is suggested to provide the eccentric arc of the eccentric pawl with an outer toothing. This improves the reliability of the return lock. The first tooth of the outer toothing adjacent to the deflection end of the eccentric pawl may rest in the deflection direction of the eccentric pawl at the cable whereby an especially fast response of the return lock in the case of movement of the cable counter to the tightening direction is ensured.

According to one embodiment of the invention the eccentric pawl is designed such that the eccentric arc of the eccentric pawl has an increasing radius relative to the rotational axis of the eccentric pawl from the first tooth positioned adjacent to the deflection end of the eccentric pawl whereby the radius at the end of the eccentric arc is greater than the spacing between the rotational axis and the counter plate. Due to this design a complete rotation of the eccentric pawl upon its rotation counter to the tightening direction is prevented.

An especially advantageous embodiment of the invention suggests that the eccentric pawl with deflection end and eccentric arc is designed and arranged such that upon engagement of the eccentric arc at the cable, when rotated counter to the tightening direction upon the return lock becoming effective, the resulting locking action provides a force limitation of the cable pull-out for deformation of the outer toothing at the eccentric arc and/or of the cable and/or of the counter plate. In this context, a combination of the return lock with a force limitation results without requiring additional components for the force limitation. The force limitation is realized only by the dimensions of the eccentric pawl.

According to a first embodiment of the invention it may be suggested that the radius of the eccentric arc relative to the rotational axis of the eccentric pawl is less than the spacing between the rotational axis and the counter plate but greater than the radius of the deflection end in the portion adjacent to the first tooth of the eccentric arch and that the rotation of the eccentric pawl counter to the tightening direction is limited by an abutment. The eccentric arc of the eccentric pawl, upon rotation counter to the tightening direction together with the returning cable, can thus be moved while performing deformation work until the movement of the eccentric pawl is stopped at a correlated abutment so that locking of the cable is realized at the deflection device.

In the alternative, it can be provided that the radius of the eccentric arc relative to the rotational axis is less than the spacing between the rotational axis and the counter plate and that the deflection end has a radius increasing from the first tooth of the eccentric arc whereby the greatest radius of the deflection end is greater than the spacing between the rotational axis and the counter plate. In this embodiment a separate abutment is no longer needed. The eccentric pawl can rotate counter to the tightening direction with the cable movement until for a correspondingly large deflection end it will lock at the counter plate and thus effect the return lock action.

The inventive eccentric locking can be realized not only for a belt buckle tightener, as disclosed in the aforementioned European patent 0 186 880, but also in all kinds of tightening devices for safety belts in which the tightening movement is transmitted by a cable. Also, the design of the drive as a pyrotechnical or mechanical device is of no consequence in regard to realizing the invention.

According to embodiments of the invention, it is suggested to secure the belt member of the safety belt at the free end of the cable whereby the belt is fastened at a fastening members supported at the cable. In the corresponding embodiment of the invention the cable in the area between the deflection device and fastening member is surrounded by a stiff sleeve for the belt in order to provide a defined position of the cable, respectively, of the fastening member whereby the sleeve, upon tightening movement of the cable and thus movement of the fastening bracket in the direction toward the eccentric pawl, is deformed.

According to another embodiment of the invention, the cable engages with a loop directly the belt member which is guided across a stationary fastening member so that upon movement of the cable in the tightening direction the belt member is pulled into a belt loop and thus tightened.

BRIEF DESCRIPTION OF THE DRAWINGS

The drawing shows embodiments of the invention which will be described in the following. It is shown in:

FIG. 3a shows the tightening device at the moment of initiation of the return movement of the cable counter to the tightening direction;

FIG. 3b shows the tightening device during return movement;

FIG. 3c shows the tightening device at the end of the return movement;

DESCRIPTION OF PREFERRED EMBODIMENTS

Figure 1:
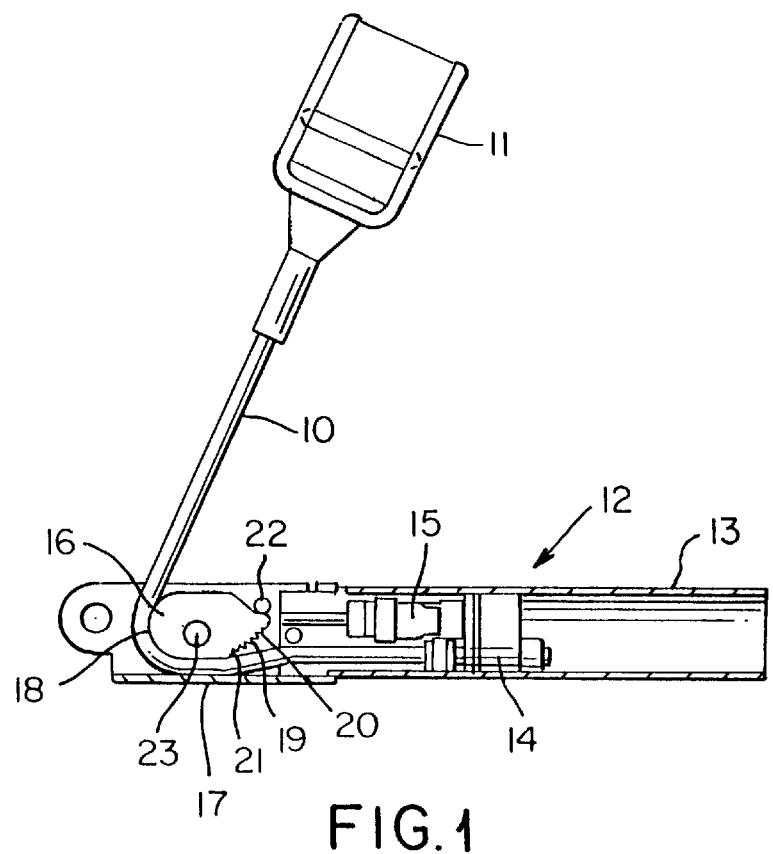
FIG. 1 a schematic representation of a tightening device in the untightened state.
Figure 2:
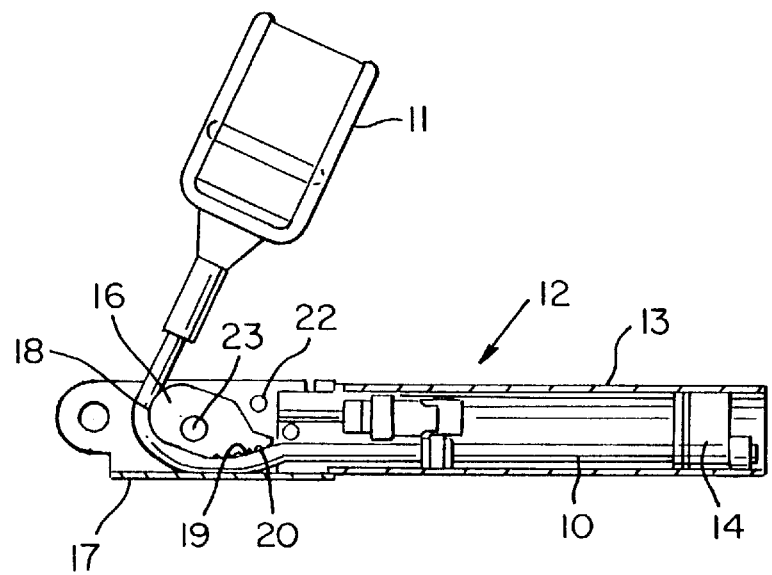
FIG. 2 the object of FIG. 1 after completion of the tightening movement with active return lock.

In the embodiment shown in FIGS. 1 and 2 without realization of a force limitation the cable 10 at its one end supports a belt buckle 11 and its other end is connected to a drive device 12 which is comprised of a cylinder 13, a piston 14 guided therein, and a propelling charge 15. The cable 10 is fastened to the piston 14. Between the belt buckle 11 and the drive device 12 the cable 10 is guided about a deflection device which is comprised of an eccentric pawl 16 rotatable about a rotational axis 23. In the extension of the drive device 12 into the area where the eccentric pawl 16 is provided, a counter plate 17 is arranged such that the cable 10 is guided between the counter plate 17 and the eccentric pawl 16.

The eccentric pawl 16 for the purpose of deflection in its initial position comprises a deflection end 18 about which cable 10 is guided, whereby adjacent to the deflection end 18, viewed in the tightening direction, i.e., in the direction of movement of the piston 14 in the cylinder 13, an eccentric arc 19 is provided which has an outer toothing 20. The first tooth 21 of the outer toothing 20 viewed in the tightening direction is positioned in the initial position shown in FIG. 1 at the cable 10. In this initial position the eccentric pawl 16 is prevented by a stop 22 at the housing with regard to rotational movement in the tightening direction and is thus secured.

In the shown embodiment the eccentric arc 19 has an increasing radius relative to the rotational axis 23 of the eccentric pawl 16 starting at the first tooth 21 adjacent to the deflection end 18. At the end of the eccentric arc 19 the radius is greater than the spacing between the rotational axis 23 and the counter plate 17. With such a geometric design of the eccentric pawl 16 it is ensured that upon return movement of the cable 10 counter to the tightening direction the force acting via the deflection end 18 has a sufficient leverage due to the embodiment of the eccentric pawl as a two-arm elongate lever in order to pivot the eccentric pawl in the clockwise direction so that initially the first tooth 21 of the eccentric arc 19 engages the cable 10. Due to the increasing radius of the eccentric arc 19, with further pivoting of the eccentric pawl 16 the cable is increasingly clamped between the counter plate 17 and the outer toothing 20 of the eccentric pawl 16 so that along a relatively short path and thus with fast response a locking action for the cable 10 at the eccentric pawl 16 is realized. In this manner the return lock is realized.

Figure 3C:
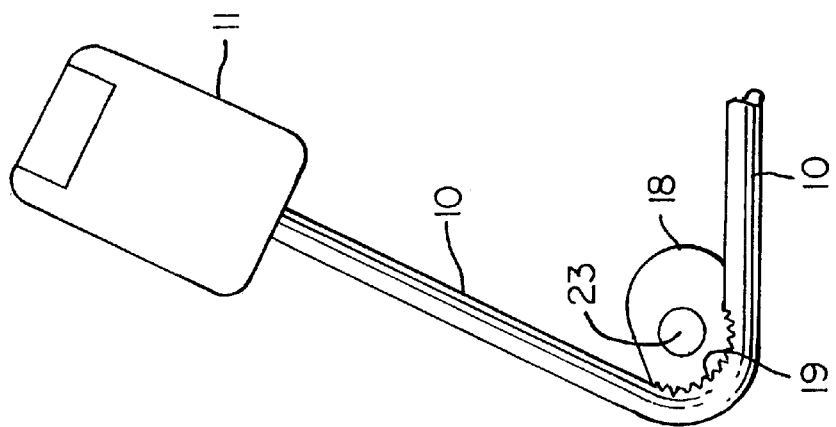
FIGS. 3a through 3c the object according to FIG. 1 with integrated force limitation; whereby
Figure 3B:
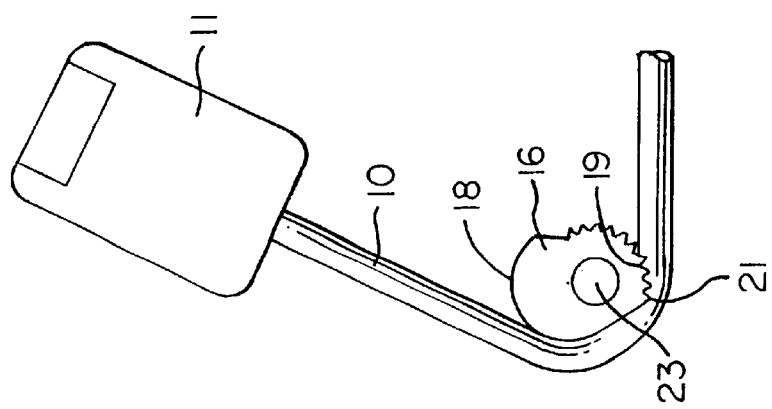
Figure 3A:
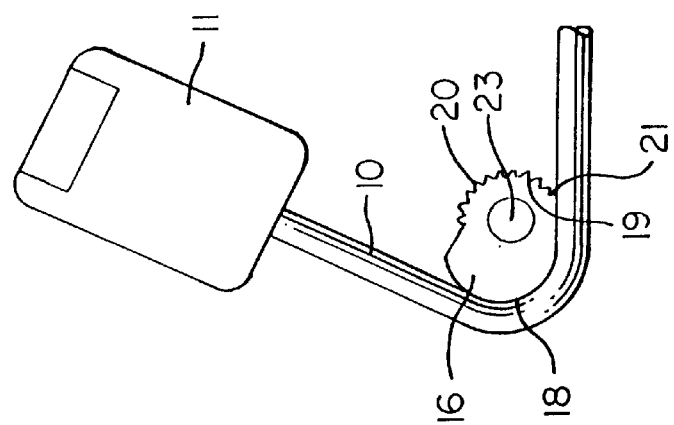

In the embodiment represented in FIGS. 3a through 3c, in addition to the return lock a force limitation during movement of the cable counter to the tightening direction is realized. This is provided simply by the geometric design of the eccentric pawl, i.e., without any additional constructive measures. For this purpose, the radius of the eccentric arc relative to the rotational axis 23 of the eccentric pawl 16 is smaller than the spacing between the rotational axis 23 and the counter plate 17 so that with the deforming clamping of the cable 10 between the counter plate 17 and the outer toothing 20 of the eccentric arc 19 causes the eccentric arc 19 to move across the counter plate 17. The deformation work provides the additional force limitation action. Since the radius of the deflection end within at least a portion thereof is greater than the spacing between the rotational axis 23 and the counter plate 17, the rotation of the eccentric pawl 16 is limited by abutment of the deflection end 18 on the cable 10, respectively, by the inhibited further rotation of the deflection end 18 due to the increasing forces so that the locking of the cable 10 is realized at the deflection device.

According to one embodiment of the invention, the force limitation may also include deformation of the counter plate 17.

Figure 4:
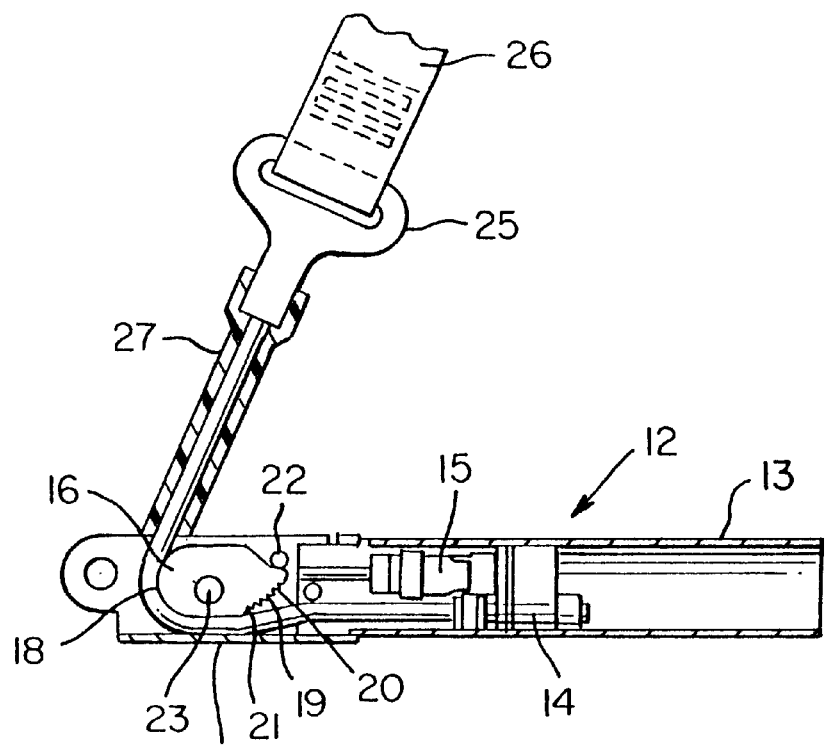
FIG. 4 shows the object of FIG. 1 in another embodiment.

The embodiment represented in FIG. 4 differs from the embodiment shown in FIG. 1 in that at the free end of the cable 10, instead of the safety belt buckle 11, a fastening member 25 is provided to which the belt member 26 of a safety belt is attached, especially by sewing. In an area extending between the fastening member 25 and the eccentric pawl 16 the cable 10 is surrounded by a stiff sleeve 27 which upon tightening movement of the cable 10 and thus movement of the fastening member 25 onto the eccentric pawl 16 is deformed, respectively, destroyed.

Figure 5:
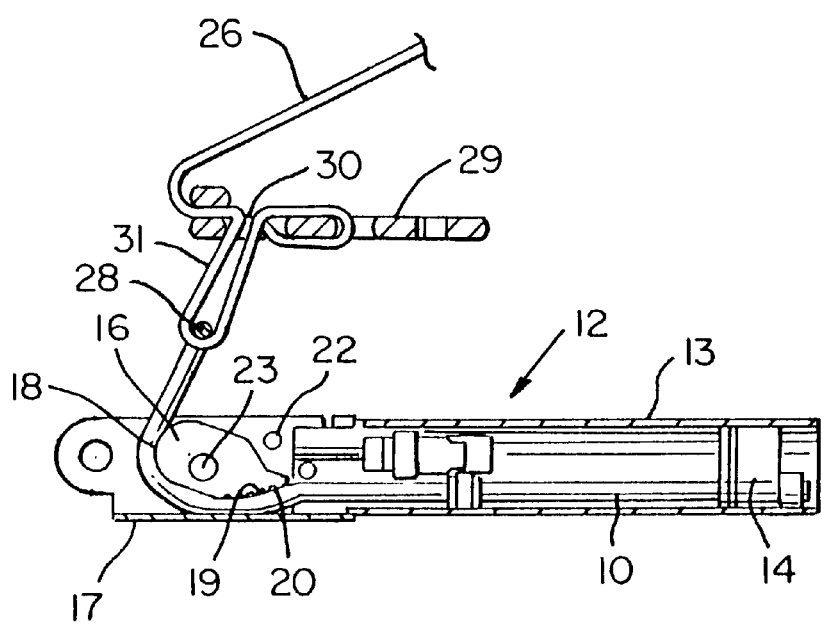
FIG. 5 shows the object of FIG. 4 in a further embodiment after completion of the tightening movement and with active return lock.

An alternative to FIG. 4, including a direct connection of the belt member 26 at the cable 10, is shown in FIG. 5. The belt member 26 is secured at a fixedly mounted fastening member whereby the cable 10 has a loop 28 at its end which engages a perforation 30 within the fastening member 29 so that upon tightening movement the movement of the loop 28 entrains the belt member 26 to form a belt loop 31, thus tightening the belt member as is shown in the tightened positioned of FIG. 5.

The features disclosed in the above description, the claims, the Abstract, and the drawing of the object of these documents, may be important individually as well as in any suitable combination for realizing the invention in its various embodiments. The present invention is, of course, in no way restricted to the specific disclosure of the specification and drawings, but also encompasses any modifications within the scope of the appended claims.

What is claimed is:

1. A tightening device for a safety belt, said tightening device comprising:

a cable having a first end and a second end;

a drive connected to said first end of said cable, wherein said drive, when activated, moves said cable in a tightening direction;

said second end of said cable connected to a safety belt;

a deflection device about which said cable is guided;

said deflection device comprising a rotatable eccentric pawl and a stop, wherein said stop limits rotation of said eccentric pawl when rotated upon movement of said cable in said tightening direction and thus defines a deflection position of said eccentric pawl;

said eccentric pawl having an elongate extension extending in a direction of a cable portion extending between said drive and a deflection location at said deflection device;

said eccentric pawl having a deflection end guiding said cable at said deflection location;

said eccentric pawl having an eccentric arc opposite said deflection end;

a counter plate positioned opposite said eccentric pawl, with said cable being guided between said counter plate and said eccentric pawl;

wherein said eccentric arc is a return lock preventing movement of said cable in a return direction opposite said tightening direction by engaging said cable and locking said cable in said return direction;

wherein said eccentric arc has an outer toothing and wherein a first tooth of said outer toothing positioned proximal to said deflection end rests at said cable in said deflection position of said eccentric pawl;

wherein said eccentric arc has a radius, relative to a rotational axis of said eccentric pawl, increasing from said first tooth in a direction away form said deflection end, wherein said radius at an end of said eccentric arc remote form said first tooth is greater than a spacing between said rotational axis and said counter plate;

wherein said deflection end has a radius increasing from said first tooth and wherein the greatest value of said radius of said deflection end is greater than a spacing between said rotational axis and said counter plate.

2. A tightening device according to claim 1, wherein said eccentric pawl is designed such that upon engagement of said cable by said eccentric arc, when said cable moves in said return direction, a force limitation in said return direction is provided for deformation of at least one of said eccentric arc, said cable or said counter plate.

3. A tightening device according to claim 2, wherein said eccentric arc has a radius, relative to a rotational axis of said eccentric pawl, and said radius is smaller than a spacing between said rotational axis and said counter plate and greater than a radius of said deflection end in an area adjacent to said first tooth, wherein a rotation of said eccentric pawl in said return direction is limited by an abutment.

4. A tightening device according to claim 1, including an axle on which said eccentric pawl is rotatably mounted, wherein said axle is a fastening element for said tightening device.

5. A tightening device according to claim 1, wherein said second end of said cable is connected to a buckle of a safety belt.

6. A tightening device according to claim 1, wherein said second end of said cable is connected to a belt portion of a safety belt.

7. A tightening device according to claim 6, wherein said second end of said cable comprises a cable loop and wherein said cable loop engages a portion of the safety belt guided through a fastening member of the safety belt such that a tightening movement of said cable causes the safety belt to be pulled into a loop and to thus be tightened.

8. A tightening device according to claim 6, wherein said second end of said cable comprises a fastening member for a belt portion of a safety belt, wherein said cable in an area between said deflection point and said second end is enclosed by a stiff sleeve that is deformable when said cable is tightened.

* * * * *